United States Patent Office 2,752,373
Patented June 26, 1956

2,752,373
PROCESS FOR PREPARING 6,8-DITHIOOCTANOIC ACID

Donald S. Acker, Wilmington, Del., assignor to E. I. du Pont de Nemours and Company, Wilmington, Del., a corporation of Delaware No Drawing. Application December 10, 1952, Serial No. 325,237

4 Claims. (Cl. 260—399)

This invention relates to organic chemistry and more particularly to the preparation of saturated dimercapto carboxylic compounds and derivatives thereof.

α-Lipoic acid [5(1,2-dithiolane-3-yl)pentanoic acid] has recently been recognized as a B vitamin involved in the biochemical decarboxylation of α-keto acids and as a growth factor for certain microorganisms. These discoveries have stimulated interest in its synthesis, not only to establish its precise structure, but also to provide material for use in determining its nutritional importance in higher animals. Two different methods have been described for synthesizing α-lipoic acid in the laboratory. The first [Bullock et al., J. Am. Chem. Soc. 74, 1868 (1952)] starts with β-furylacrolein and employs the series of reactions schematically represented below:

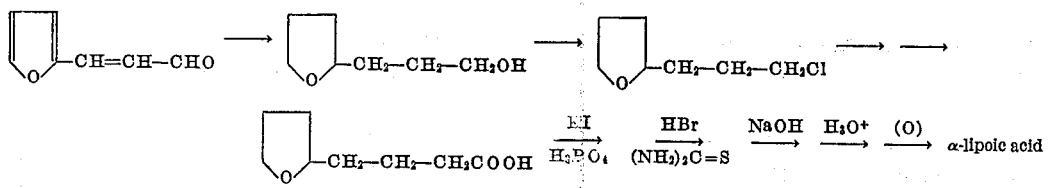

The second method [Bullock et al., J. Am. Chem. Soc. 74, 3455 (1952)] starts with the keto ester obtained by condensing 5-carbethoxy valeroyl chloride with ethylene in the presence of aluminum chloride and employs the series of reactions schematically represented below:

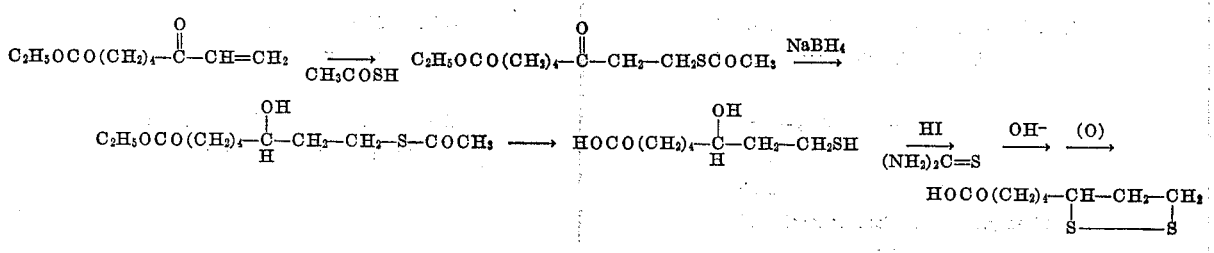

Because of the many steps involved in these syntheses, the yield of desired α-lipoic acid is low.

This invention has as an object the provision of a process for the preparation of intermediates for α-lipoic acid. Another object is the provision of an alternative route to α-lipoic acid. A further object is the provision of a process for the preparation of dimercapto carboxylic acids and derivatives thereof. Other objects will appear hereinafter.

These objects are accomplished by the present invention of a process for the preparation of dimercapto monocarboxylic acids of the general formula $$\text{HOCO-R-CH-CH}_2\text{-CH}_2$$
$$\quad\quad\quad | \quad\quad\quad |$$
$$\quad\quad\quad \text{SH} \quad\quad \text{SH}$$

in which R is a bivalent organic radical, preferably a hydrocarbon radical containing from 1 to 8 carbon atoms, by the reaction of hydrogen and hydrogen sulfide over a hydrogenation catalyst which is active in the presence of sulfur at an elevated temperature and pressure with a compound of the formula $$\text{YCOR-C-CH}_2\text{-H}_2\text{C-X}$$
$$\quad\quad\quad\quad ||$$
$$\quad\quad\quad\quad \text{Z}$$

in which Z is oxygen, sulfur, or imino, Y is hydroxyl or a group hydrolyzable to hydroxyl, and X is mercapto, a group which can be hydrolyzed to mercapto, or a group which is reducible to mercapto.

The dimercapto monocarboxylic compounds of the above formula are readily oxidized to (1,2-dithiolane-3-yl)monocarboxylic acids. The process of this invention accordingly provides a route to the growth factor 5-(1,2-dithiolane-3-yl)pentanoic acid, and to similar acids, which involves but three steps, namely, a reductive procedure, a hydrolysis, and an oxidation, employs readily available reactants, and requires simple, available equipment.

In preparing the dimercapto monocarboxylic compounds of the general formula $$\text{HOCO(R)-CH-CH}_2\text{-CH}_2$$
$$\quad\quad\quad\quad | \quad\quad\quad |$$
$$\quad\quad\quad\quad \text{SH} \quad\quad \text{SH}$$

a pressure reactor is charged with the compound $$\text{YCOR-C-CH}_2\text{-CH}_2\text{-X}$$
$$\quad\quad\quad ||$$
$$\quad\quad\quad \text{Z}$$

together with sulfur or other source of hydrogen sulfide, a solvent, e. g., acetic acid, and a hydrogenation catalyst which is active in the presence of sulfur. The reactor is then charged with hydrogen at superatmospheric pressure and agitated and heated to a temperature at which reaction proceeds at a suitable rate, usually in the neighborhood of 140° to 225° C. After reaction is complete, as evidenced by cessation of hydrogen absorption, the reactor is cooled, the product is filtered from the catalyst and blown with an inert gas, e. g., nitrogen, to drive out unreacted hydrogen sulfide. The product is then isolated by the usual methods of distillation or solvent extraction, or may be hydrolyzed with aqueous acid or alkali and oxidized in dilute solution by air or iodine directly to a (1,2-dithiolane-3-yl)monocarboxylic acid and this may be isolated by crystallization or other methods known to those skilled in the art.

The following example in which parts are by weight is illustrative of the invention.

EXAMPLE

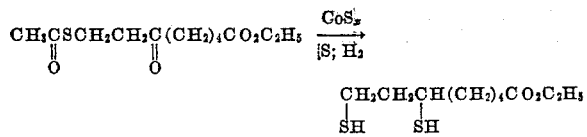

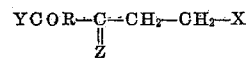

Twenty parts of ethyl 8-acetylthio-6-ketooctanoate, 20 parts of sulfur and 20 parts of acetic acid are charged into a small shaking autoclave together with 5 parts of cobalt polysulfide catalyst. Hydrogen is forced into the autoclave to a pressure of 1000 p. s. i. (lb./sq. in.) and the autoclave is heated to a temperature of 150° C. with frequent addition of hydrogen as needed to hold the pressure in the range 1000 to 2500 p. s. i. After two hours the absorption of hydrogen has become very slow and the temperature is raised and maintained at 175° C., and then to 200° C. until all hydrogen absorption ceases. The total reaction time is about 2½ hours.

The contents of the autoclave are filtered to remove the catalyst and the filtrate diluted with a suitable solvent such as chloroform. Iodine titration of an aliquot portion gives a mercaptan yield corresponding to the formation of ethyl lipoate [ethyl 5(1,2-dithiolane-3-yl)-pentanoate] in 32% of theoretical. Microbiological assay [a modification of the procedure of I. C. Gunsalus et al., J. Biol. Chem. 194, 849 (1952) using dried cells] indicated the presence of a reduced form of lipoic acid in 8% yield. Hydrolysis of the remaining filtrate with acid, and oxidation forms the cyclic disulfide and gives DL - α - lipoic acid [DL - 5(1,2 - dithiolane - 3 - yl)pentanoic acid], which was isolated in crystalline form, M. P. 59–60° C.

The invention has been illustrated with particular reference to ethyl 8-acetylthio-6-ketooctanoate, but it is applicable to any compound of the general formula $$YCOR-\underset{\underset{Z}{\|}}{C}-CH_2-CH_2-X$$

wherein Y is hydroxyl or a group hydrolyzable to hydroxyl, Z is oxygen, sulfur, or imino, and X is a thiol group, a group hydrolyzable to a thiol group, or a group reducible to a thiol group. Specific compounds of this class are those listed in the left column of Table I below. When these compounds are substituted for the ethyl 8-acetylthio-6-ketooctanoate of the example and reductively treated and the reduction products hydrolyzed, the compounds listed in the right column are obtained. Oxidation of these dimercaptocarboxylic acids in dilute solution with air or iodine leads to the formation of the corresponding cyclic disulfides.

*Table I*

| Structure and Name of Starting Material | Structure and Name of Product Upon Reductive Procedure and Hydrolysis |
|---|---|
| HOCOCH₂—C(=O)—CH₂—CH₂—S—COCH₃<br>5-thioacetyl-3-ketopentanoic acid | HOCOCH₂—CH(SH)—CH₂—CH₂—SH<br>3,5-dimercaptopentanoic acid |
| H₂NCO(CH₂)₄—C(=S)—CH₂—CH₂—SCOC₁₇H₃₅<br>8-thiostearoyl-6-thioxooctanamide | HOCO(CH₂)₄—CH(SH)—CH₂—CH₂—SH<br>6,8-dimercaptooctanoic acid |
| C₂H₅OCO(CH₂)₈—C(=NH)—CH₂—CH₂—S—COC₈H₁₇<br>ethyl 12-thiooctanoyl-10-iminododeca-oate | HOCO(CH₂)₈—CH(SH)—CH₂—CH₂—SH<br>10,12-dimercaptododecanoic acid |
| HOCO(CH₂)₄—C(=N-C₆H₅)—CH₂—CH₂—S—S—C₆H₅<br>8(phenyldithio)6-N-phenyliminooctanoic acid | HOCO(CH₂)₄—CH(SH)—CH₂—CH₂—SH<br>6,8-dimercaptooctanoic acid |
| HOCO(CH₂)₅—C(=S)—CH₂—CH₂—S(=O)(CH₃)(C₆H₅)<br>9(benzylsulfone)7-thiooxononanoic acid | HOCO(CH₂)₅—CH(SH)—CH₂—CH₂—SH<br>7,9-dimercaptononanoic acid |
| HOCO(CH₂)₄—C(=NH)—CH₂—CH₂—SH<br>8-mercapto-6-iminooctanoic acid | HOCO(CH₂)₄—CH(SH)—CH₂—CH₂—SH<br>6,8-dimercaptooctanoic acid |
| HOCO—CH₂—CH₂—CH₂—O—CH₂—C(=S)—CH₂—CH₂—SCOCH₃<br>4-[(4-thioacetyl)-2-thioxobutoxy]butanoic acid | HOCOCH₂—CH₂—CH₂—O—CH₂—CH(SH)—CH₂—CH₂—SH<br>4-(2,4-dimercaptobutoxy)butanoic acid |
| ClCO—(CH₂)₂—C(=S)—CH₂—CH₂—SCOCH₃<br>1-thioacetyl-3-thioxo-5(chloroformyl)pentane | HOCO(CH₂)₂—CH(SH)—CH₂—CH₂(SH)<br>4,6-dimercaptohexanoic acid |
| CH₃—CO—O—CO(CH₂)₅—C(=O)—CH₂—CH₂—SH<br>9-mercapto-7-keto-nonanoic acetic anhydride | HOCO(CH₂)₅—CH(SH)—CH₂—CH₂(SH)<br>7,9-dimercaptononanoic acid |

In place of the carbonyl compounds listed above, their derivatives which are convertible to carbonyl compounds may be used. Examples are the hemi-acetals, ketimines, hydrazones, semi-carbazones, anils, etc.

In hydrogenating preformed thiocarbonyl compounds the conditions employed are the same as for the combined formation and hydrogenation of the thiocarbonyl compounds.

The process of this invention may be carried out over a considerable range of temperatures and pressures. Reaction occurs in many instances at temperatures as low as 100° C. As the temperature is raised the reaction rate increases and in most cases optimum results from the standpoint of reaction rate and yield of desired product are realized at temperatures in the range of 140° to 225° C. With compounds which are stable at temperature above 225° C. it is advantageous to carry out the operation at temperatures up to at least 200° C. and thus reduce the time of reaction without sacrifice in yield of desired product.

The reaction proceeds well even at low pressures but in order to insure a practical rate of reaction it is desirable to operate at pressures which are at least 100 lb./sq. in. As a rule, there is no practical advantage from the use of pressures above 20,000 lb./sq. in. and this therefore is a practical upper pressure limit.

The use of a solvent is optional. Solvents, however, in addition to providing better contact between the reactants, also aid in heat dissipation and thus in the thermal control of the reaction. Their use therefore constitutes a preferred embodiment. The choice of solvent must be made with due consideration of the particular compound being reductively treated. Suitable media are water, organic acids, alcohols, dioxane and the like.

In the example sulfur has been used as a source of hydrogen sulfide, as it is especially convenient in generating the desired reactant. However, hydrogen sulfide itself can be charged into the reactor. In place of hydrogen sulfide or sulfur other sulfur compounds that are converted to hydrogen sulfide under the conditions of reaction can be used. Examples are carbon bisulfide, sulfur dioxide, ethyl tetrasulfide, etc. The amount of hydrogen sulfide used can be varied widely. It is usually desirable to employ an excess of hydrogen sulfide over the amount theoretically required and at completion of the reaction vent off the unreacted excess.

In the process of this invention there may be employed any sulfactive hydrogenation catalyst, i. e., one active in the presence of sulfur. These are found in ruthenium and certain metal sulfides, for example, in the sulfides of such metals as iron, nickel, cobalt, copper, molybdenum, etc. These metal sulfides may be prepared by a variety of methods, for example, by precipitating the metal sulfide from a solution of a metal salt with hydrogen sulfide, a solution of alkali or alkaline earth metal sulfide, or polysulfide, or ammonium sulfide or polysulfide. Another method that has been found to yield very active sulfactive hydrogenation catalysts is to treat a finely divided pyrophoric or activated metal, suspended in a liquid medium with hydrogen sulfide or sulfur until sulfidation is essentially complete. Alternative methods for preparing these catalysts include heating powdered metals or metal compounds, e. g., oxides, carbonates, or sulfides with volatile sulfiding agents, such as, sulfur, hydrogen sulfide or carbon bisulfide and extraction with sodium polysulfide of the alkali soluble component of alloys of alkali soluble metals with hydrogenating metals, as disclosed and claimed in U. S. Patent 2,402,626.

Instead of charging the metal sulfide catalyst as such into the reactor it may be formed in situ by placing the finely divided pyrophoric or activated metal in the reactor together with the other reactants. The sulfur or hydrogen sulfide present converts the metal to the active metal sulfide in the early stages of the reaction. The catalyst may be substantially pure metal sulfide or a combination of metal sulfides. Other substances may be present, such as, extenders, for example, kieselguhr, alumina, magnesia, etc.

The proportion of catalyst may be varied considerably depending upon the particular catalyst, conditions of operation, etc. In general the amount will range from 0.5 to 30% by weight of the substance being processed. Since good results are obtained using from 2 to 20% by weight of catalyst, this constitutes the proportion most generally used.

This invention constitutes a useful method for preparing 1,3-dimercapto carboxylic compounds which are readily oxidizable to the corresponding 1,2-dithiolane-3-yl derivatives. These 1,3-dimercapto carboxylic compounds are useful as dying oil additives, as metal chelating agents, and copper deactivators in gasoline, etc. This process is versatile and simple and therefore constitutes a marked advance over methods previously used for preparing these compounds.

The foregoing detailed description has been given for clearness of understanding only and no unnecessary limitations are to be understood therefrom. The invention is not limited to the exact details shown and described for obvious modifications will occur to those skilled in the art.

What is claimed is:

1. The process for the preparation of 6,8-dithiooctanoic acid which comprises bringing hydrogen and hydrogen sulfide at a temperature of 100–225° C. and a pressure of at least 100 lbs./sq. in. in contact with a hydrogenation catalyst and a compound

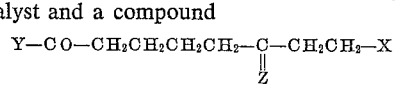

wherein Z is selected from the class consisting of oxygen, sulfur, and imino, Y is selected from the class consisting of the hydroxyl group and groups hydrolyzable thereto and X is a group selected from the class consisting of the thiol group, groups hydrolyzable to the thiol group, and groups reducible to the thiol group.

2. The process for the preparation of 6,8-dithiooctanoic acid which comprises bringing hydrogen and hydrogen sulfide at a temperature of 100–225° C. and a pressure of at least 100 lbs./sq. in. in contact with a hydrogenation catalyst and an alkyl 8-acylthio-6-ketooctanoate.

3. The process for the preparation of 6,8-dithiooctanoic acid which comprises bringing hydrogen and hydrogen sulfide at a temperature of 100–225° C. and a pressure of at least 100 lbs./sq. in. in contact with a hydrogenation catalyst and ethyl 8-acetylthio-6-ketooctanoate.

4. Process of claim 3 wherein the hydrogen sulfide is developed in situ from sulfur and hydrogen.

References Cited in the file of this patent

UNITED STATES PATENTS 2,402,639  Lazier _____ June 25, 1946